US010437617B2

(12) United States Patent
Scott et al.

(10) Patent No.: US 10,437,617 B2
(45) Date of Patent: *Oct. 8, 2019

(54) OFFLINE VOLUME MODIFICATIONS

(71) Applicant: Amazon Technologies, Inc., Reno, NV (US)

(72) Inventors: Jonathan N. Scott, Snohomish, WA (US); Vikram V. Sahijwani, Kirkland, WA (US); George Oliver Jenkins, Redmond, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/620,603

(22) Filed: Jun. 12, 2017

(65) Prior Publication Data
US 2017/0337071 A1 Nov. 23, 2017

Related U.S. Application Data

(63) Continuation of application No. 13/916,423, filed on Jun. 12, 2013, now Pat. No. 9,678,769.

(51) Int. Cl.
*G06F 9/48* (2006.01)
*G06F 9/50* (2006.01)
(Continued)

(52) U.S. Cl.
CPC ............... *G06F 9/455* (2013.01); *G06F 8/60* (2013.01); *G06F 8/65* (2013.01); *G06F 8/70* (2013.01);
(Continued)

(58) Field of Classification Search
CPC .. G06F 9/455; G06F 9/45533; G06F 9/45545; G06F 9/4555; G06F 9/45558; G06F 2009/45562; G06F 2009/45579; G06F 2009/45583; G06F 2009/45595; G06F 9/50; G06F 9/5005; G06F 9/5011; G06F 9/5016; G06F 9/5027; G06F 9/5061; G06F 9/5072; G06F 9/5077; G06F 8/60; G06F 8/65; G06F 8/70; G06F 8/71
See application file for complete search history.

(56) References Cited

U.S. PATENT DOCUMENTS 8,171,201 B1 5/2012 Edwards, Sr.
9,417,897 B1 * 8/2016 Klompje ................... G06F 8/61
(Continued)

OTHER PUBLICATIONS

Non-Final Rejection issued in U.S. Appl. No. 13/916,423, dated May 28, 2015.
(Continued)

*Primary Examiner* — Charles M Swift
(74) *Attorney, Agent, or Firm* — Hogan Lovells US LLP

(57) ABSTRACT

A host computing device can include a host domain that includes an agent for configuring the operation and/or functionality of virtual machine instances and/or operating systems associated with the instances, which may be heterogeneous (i.e., running different operating systems than each other). One or more data volumes associated with the host machine can include an image of an operating system. In an embodiment the agent can access the image of the operating system and configure operating system settings, add data, and/or remove data.

17 Claims, 8 Drawing Sheets

(51) Int. Cl.
*G06F 8/65* (2018.01)
*G06F 8/70* (2018.01)
*G06F 9/455* (2018.01)
*G06F 8/60* (2018.01)
*G06F 8/71* (2018.01)
*G06F 9/445* (2018.01)

(52) U.S. Cl.
CPC .............. *G06F 8/71* (2013.01); *G06F 9/4555* (2013.01); *G06F 9/45533* (2013.01); *G06F 9/45545* (2013.01); *G06F 9/45558* (2013.01); *G06F 9/50* (2013.01); *G06F 9/5005* (2013.01); *G06F 9/5011* (2013.01); *G06F 9/5016* (2013.01); *G06F 9/5027* (2013.01); *G06F 9/5061* (2013.01); *G06F 9/5072* (2013.01); *G06F 9/5077* (2013.01); *G06F 9/4451* (2013.01); *G06F 9/44505* (2013.01); *G06F 2009/45562* (2013.01); *G06F 2009/45579* (2013.01); *G06F 2009/45583* (2013.01); *G06F 2009/45595* (2013.01)

(56) References Cited

U.S. PATENT DOCUMENTS

| | | |
|---|---|---|
| 2008/0091929 A1 | 4/2008 | Oberhaus et al. |
| 2008/0244028 A1 | 10/2008 | Le et al. |
| 2008/0244577 A1 | 10/2008 | Le |
| 2009/0007105 A1 | 1/2009 | Fries et al. |
| 2009/0328030 A1 | 12/2009 | Fries |
| 2010/0162238 A1 | 6/2010 | Warfield |
| 2010/0251242 A1* | 9/2010 | Sivasubramanian ... G06F 12/02 718/100 |
| 2011/0202765 A1 | 8/2011 | McGrane et al. |
| 2011/0238969 A1 | 9/2011 | Warkentin et al. |
| 2012/0060153 A1 | 3/2012 | Bealkowski |
| 2012/0089972 A1 | 4/2012 | Scheidel et al. |
| 2012/0174096 A1 | 7/2012 | Conover |
| 2013/0086585 A1 | 4/2013 | Huang et al. |
| 2013/0152084 A1 | 6/2013 | Arcese et al. |
| 2013/0247020 A1 | 9/2013 | Fontignie et al. |
| 2013/0263208 A1 | 10/2013 | Challa |
| 2013/0290958 A1* | 10/2013 | Ansel .................. G06F 9/45504 718/1 |
| 2013/0297921 A1 | 11/2013 | Wright et al. |
| 2014/0164598 A1 | 6/2014 | Srinivasan |
| 2014/0258446 A1 | 9/2014 | Bursell |
| 2014/0325514 A1 | 10/2014 | Benedetti |
| 2014/0359617 A1 | 12/2014 | Fontignie et al. |

OTHER PUBLICATIONS

Final Rejection issued in U.S. Appl. No. 13/916,423, dated Dec. 11, 2015.
Non-Final Rejection issued in U.S. Appl. No. 13/916,423, dated May 13, 2016.
Final Rejection issued in U.S. Appl. No. 13/916,423, dated Sep. 22, 2016.
Notice of Allowance issued in U.S. Appl. No. 13/916,423, dated Feb. 14, 2017.

* cited by examiner

OFFLINE VOLUME MODIFICATIONS

CROSS-REFERENCE TO RELATED APPLICATIONS

This application is a continuation of allowed U.S. application Ser. No. 13/916,423 entitled "OFFLINE VOLUME MODIFICATIONS," filed Jun. 12, 2013, which is incorporated herein by reference for all purposes.

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A customer typically will rent, lease, or otherwise pay for access to resources through the cloud, such that the customer does not have to purchase and maintain the hardware and/or software to provide access to these resources. Many cloud computing providers utilize virtualization to allow multiple users to share the underlying hardware and/or software resources. Virtualization can allow computing servers, storage device or other resources to be partitioned into multiple isolated instances (e.g., virtual machines) that are each owned by a particular user. Conventionally, many customers utilize a configuration service that resides within the instance to perform various functions that modify the behavior of the instance. A potential disadvantage to such an approach, at least from a customer point of view, is that some of these functions trigger reboots, which cause an increase in boot time, costing the customer time and money. Accordingly, it can be desirable to provide additional control for modifying the behavior of the instance. Unfortunately, conventional provisioning and virtualization approaches are restricted in the functionality that can be provided.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing volumes in a shared computing environment. In particular, various embodiments utilize an agent (or other such component) of a host machine to modify operation and/or functionality of one or more virtual machine instances and/or operating systems configured to run on the virtual machine instance while the virtual machine instances and/or operating systems are offline. For example, a host computing device can include a host domain that includes an agent. The agent can access a volume containing an operating system while the operating system is not running and can configure the operating system by adding, altering, and/or removing information such as license keys, encryption keys, domain information, language settings, security information, or any other information that can be used to configure an operating system and/or a virtual machine instance.

For example, in accordance with an embodiment, a request from a user or other such entity (e.g., an application), including configuration information, can be received at the host machine. The request can be, for example, to modify a volume containing an operating system associated with the user, where the agent can modify the volume by adding and/or removing data. When the virtual machine instance is launched and the operating system boots, the operation and/or functionality of the instance and/or the operating system associated with the instance will have been modified based on the modifications to the volume. Various other applications, processes, and uses are presented below with respect to the various embodiments.

Figure 1:
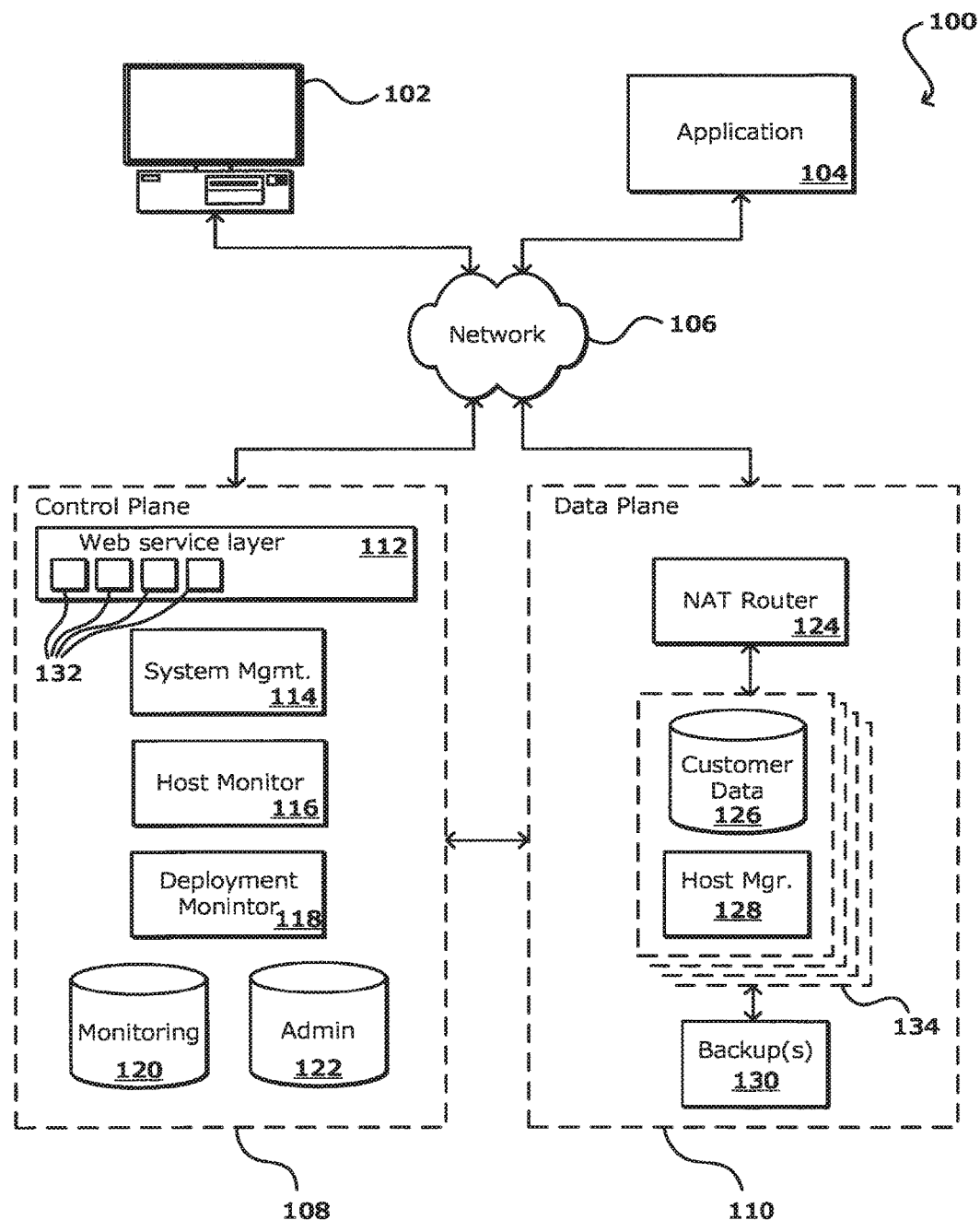
FIG. 1 illustrates an environment in which various embodiments can be implemented.

FIG. 1 illustrates an example of an electronic resource environment 100 that can be used in accordance with various embodiments. In this example, a computing device 102 for an end user is shown to be able to make calls through at least one network 106 (e.g., the Internet, a cellular network, a wireless network, a local area network (LAN), etc.) into a control plane 108 to perform a task such as to provision a data repository or launch a virtual machine in a data plane 110. The user or an application 104, for example, can access the repository and/or virtual machine directly through an interface of the data plane 110. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation, logically or geographically, of at least some resources (e.g., hardware and/or software) used to provide the respective functionality.

The control plane 108 in this example is essentially a virtual layer of hardware and software components that handles control and management actions, such as provisioning, instantiating, launching, scaling, replication, etc. The control plane in this embodiment includes a Web services layer 112, or tier, which can include at least one Web server, for example, along with computer-executable software, application servers, or other such components. The Web services layer also can include a set of APIs 132 (or other such interfaces) for receiving Web services calls or requests from across the at least one network 106. Each API can be provided to receive requests for at least one specific action to be performed with respect to the data environment. Upon receiving a request to one of the APIs, the Web services layer can parse or otherwise analyze the request to determine the steps or actions needed to act on or process the call. For example, a Web service call might be received that includes a request to launch a virtual machine. In this example, the Web services layer can parse the request to determine the type of virtual machine to be created, the type of hardware requested (if any), or other such aspects. Information for the request can be written to an administration ("Admin") data store, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures. Functions or configurations of the APIs or other such components can be managed by at least one system management component 114, or other such system or service.

The control plane 108 in this embodiment includes at least one host monitoring component 116. The host monitoring component can comprise any appropriate combination of hardware and/or software including instructions for monitoring aspects of the data plane. For example, the host monitoring component can include a dedicated host machine, process distributed across a number of machines, or a Web service, among other such options. When a virtual machine ("VM") is created in the data plane, information for the VM can be written to a data store in the control plane, such as a monitoring data store 120. It should be understood that the monitoring data store can be a separate data store, or can be a portion of another data store such as a distinct set of tables in an Admin data store 122, or other appropriate repository. A host monitoring component 116 can access the information in the monitoring data store to determine active VMs, resource instances, or other such resources or components 134 in the data plane 110. A host monitoring component also can perform other tasks, such as collecting log and/or event information from multiple components of the control plane and/or data plane, such as the Web service layer and various host managers 128. Using such event information, the monitoring component can expose customer-visible events, for purposes such as implementing customer-facing APIs. A monitoring component can constantly monitor the health of all the running repositories and/or instances for the control plane, detect the failure of any of these instances, and initiate the appropriate recovery process(es).

Each resource instance 134 (e.g., data instance or virtual machine) in the data plane can include at least one data store 126 and a host manager component 128 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the instances for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager can also perform and/or mange the installation of software patches and upgrades, as well as updates to configuration (e.g., specific virtual machine images) or firmware, etc. A host manger also can collect relevant metrics, such as may relate to CPU, memory, and I/O usage.

The host monitoring component 116 in the control plane 108 can communicate periodically with each host manager 128 for monitored instances 134, such as by sending a specific request or by monitoring heartbeats from the host managers, to determine a status of each host. In one embodiment, the monitoring component includes a set of event processors (or monitoring servers) configured to issue commands to each host manager, such as to get the status of a particular host and/or instance. In at least some embodiments, a deployment monitor component 118 can also communicate with hosts, instances, and other such components to attempt to determine when versions or configurations are deployed or updated, when communications are sent, and other such information. A deployment monitor can be part of, or separate from, the host monitor, as may both be provided as part of a monitoring service of the control plane.

As discussed, once an instance is provisioned and a user is provided with a DNS address or other address or location, the user can send requests "directly" to the data plane 110 through the network using a Java Database Connectivity (JDBC) or other such client to directly interact with that instance 134. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as instance or availability failures, for example, can be masked by programmatically remapping a DNS address to any appropriate replacement instance for a use. A request received from a user 102 or application 104, for example, can be directed to a network address translation (NAT) router 124, or other appropriate component, which can direct the request to the actual instance 134 or host corresponding to the DNS of the request. As discussed, such an approach allows for instances to be dynamically moved, updated, replicated, etc., without requiring the user or application to change the DNS or other address used to access the instance. As discussed, each instance 134 can include a host manager 128 and a data store 126, for example, and can have at least one backup instance or copy in persistent storage 130. Using such an approach, once the instance has been configured through the control plane, a user, application, service, or component can interact with the instance directly through requests to the data plane, without having to access the control plane 108. For example, the user can directly issue structured query language (SQL) or other such commands relating to the data in the instance through the DNS address. The user would only have to access the control plane if the user wants to perform a task such as expanding the storage capacity of an instance. In at least one embodiment, the functionality of the control plane 108 can be offered as at least one service by a provider that may or may not be related to a provider of the data plane 110, but may simply be a third-party service that can be used to provision and manage data instances in the data plane, and can also monitor and ensure availability of those instances in a separate data plane 110.

Figure 2:
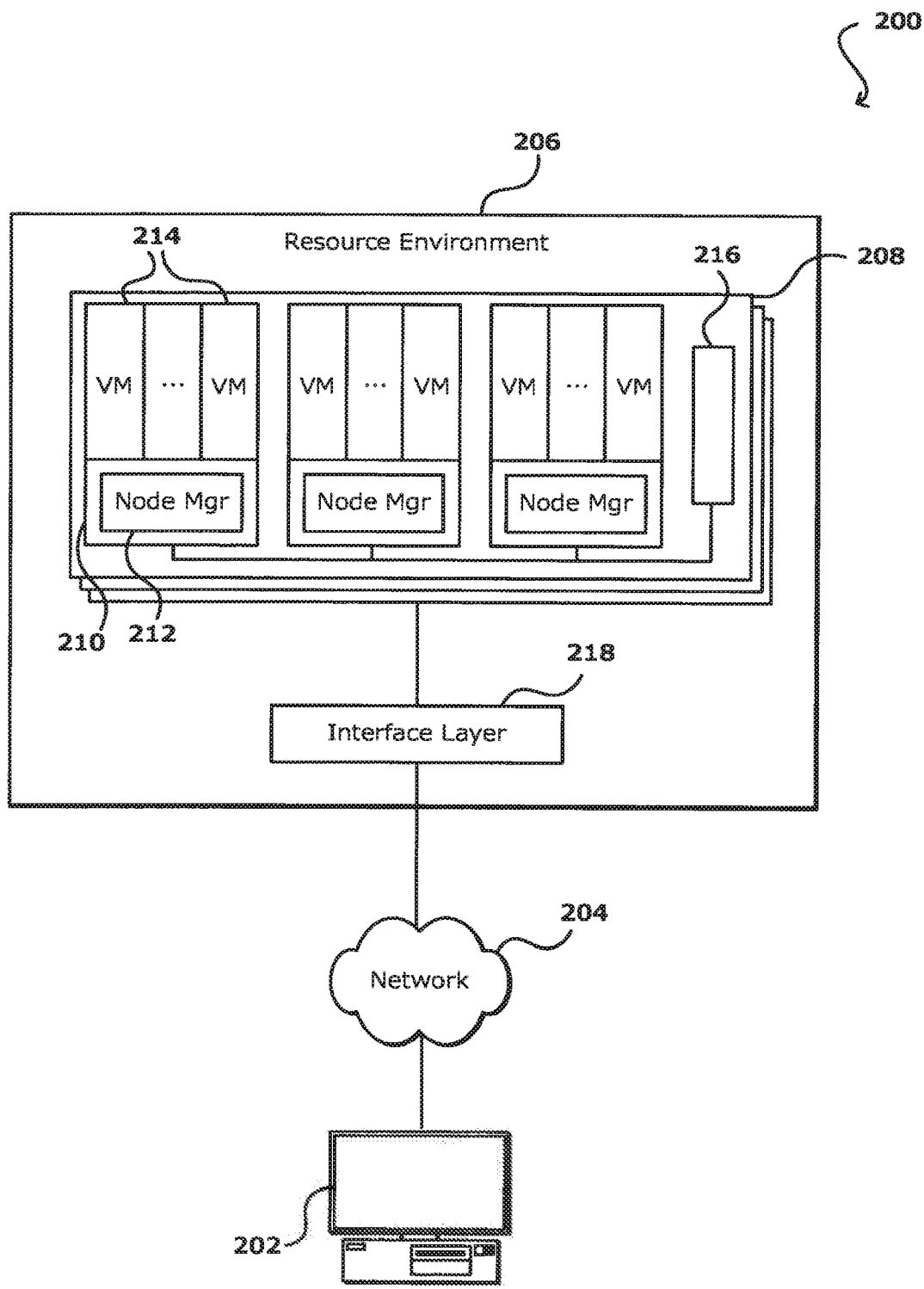
FIG. 2 illustrates a view of host machines that can execute in a data plane such as that illustrated with respect to FIG. 1.

FIG. 2 illustrates a view of host machines that can execute in a data plane such as that illustrated with respect to FIG. 1. In this example, a user or other such entity (e.g., an application) is able to utilize a computing device 202 to submit a call or request across at least one network 204 to be received to a shared resource environment 206, such as a data center or "cloud" environment, among other such options. The computing device 202 can include any appropriate device, as may include client devices such as personal computers, cell phones, handheld messaging devices, laptop computers, set-top boxes, personal data assistants, electronic book readers, and the like. The at least one network 204 can include any appropriate wired and/or wireless network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail.

The resource environment 206 in this example includes an interface layer 218, as may include components such as application programming interfaces (APIs), routers, switches, Web servers, and other such components known or used for routing communications from a user computing device 202 to an appropriate resource in the environment. The user can access a console or other graphical interface (e.g., a web application or desktop application) to make calls through the interface layer into a control plane (e.g., control plane 108 described in FIG. 1) to perform a task such as to provision a data repository, launch a virtual machine in a data plane, or select configuration parameters for a virtualization instance before the instance is launched. For example, the user can access the console and can type, select, or otherwise indicate a licensing key for their operating system image. The licensing key can be something that the agent can write into the operating system while it operating system is offline. For example, the agent (or other such component) of a host machine can receive instructions or other information indicating that the licensing key is to be include in the operating system image. The agent can access a volume containing the operating system while the operating system is not running and can configure the operating system by adding licensing key information to be accessed and used by the operating system. In various embodiments, other information can be set by the user in the console, such as but limited to domain information, language settings, username password combinations, license keys, encryption keys, language settings, security information, or any other information that can be used by an operating system and/or a virtual machine instance.

In this example, the resource environment 206 includes a number of racks 208, each rack including a number of host computing devices 210, as well as an optional rack support computing system 216 in this example embodiment. The host computing systems 210 on one of the illustrated racks 208 can execute virtual machine managers 212, which can be configured to host one or more virtual machines 214 in this example. The virtual machine manager (VMM) 212 is tasked with managing the virtual machines (VMs) on the respective host device, and handling various aspects of virtualization. Each virtual machine 214 can act as an independent computing resource for executing one or more programs (e.g., operating systems, applications, etc.) on behalf of a user. The environment can also include additional host computing systems that do not include distinct virtual machines, but may nonetheless each act as a computing resource for one or more users. For example, a user's instance could be run directly on the hardware of the host computing system, rather than in a virtual machine. The rack support computing system 216 may provide various utility services for other computing systems local to its rack (e.g., long-term program storage, metering, and other monitoring of program execution and/or of non-local block data storage access performed by other computing systems local to the rack, etc.), as well as possibly to other computing systems located in the environment 206. Each computing system may also have one or more local attached storage devices (not shown), such as to store local copies of programs and/or data created by or otherwise used by the executing programs, as well as various other components.

It will be appreciated that the example of FIG. 2 has been simplified for the purposes of explanation, and that the number and organization of host computing systems and other devices may be much larger than what is depicted in FIG. 2. For example, as one illustrative embodiment, there may be approximately tens of thousands of computing systems in a cloud environment, with at least some of those computing systems being host computing systems that may each host multiple virtual machines.

Figure 3:
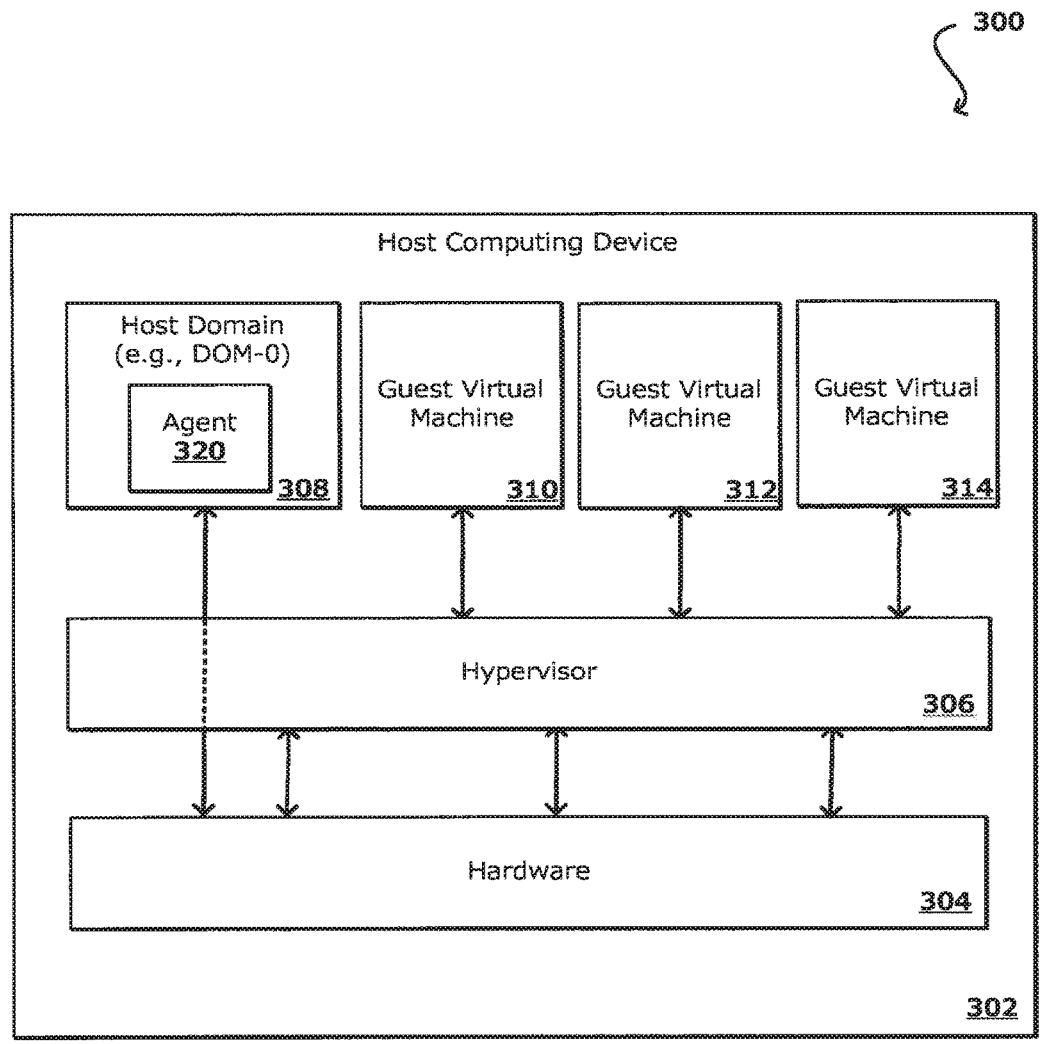
FIG. 3 illustrates an example configuration for a virtualization subsystem that can be used in accordance with various embodiments.

A number of virtualization techniques can be used to simultaneously operate a plurality of guest virtual machines (VMs) on a given host machine. FIG. 3 illustrates an example 300 virtualization subsystem. In the illustrated embodiment, the virtualization subsystem includes a native hypervisor, which can be used to create a manager virtual machines as well as a DOM-0. One of skill in the art, however, can appreciate that other kinds of virtualization subsystems can be used. Turning back to FIG. 3, the hardware 304 (e.g., the central processor and other such components) of the host computing device 302 is able to interface with the hypervisor 306 running directly on the hardware 304, such in the case of a "bare metal" or native hypervisor. Examples of hypervisors useful for such purposes include Xen, HyperV®, and the like. As known in the art, a hypervisor is a type of virtualization subsystem that can enable hardware virtualization by allowing one or more guest operating systems to operate concurrently on a host device. A hypervisor can manage the execution of the guest operating systems, and can enable multiple instances of those operating systems to share virtualized hardware resource. DOM-0, or domain zero, is typically the first domain started by a hypervisor during a boot procedure. The DOM-0 enables new domains to start, and can directly access the underlying hardware, device drivers, etc. Further, hypervisors typically run at a higher, more privileged processor state than any other software on the machine, and provide services such as memory management and processor scheduling for dependent layers and/or domains. The most privileged of such layers and/or domains resides in the service domain layer, which may include a host domain 308 that may include an administrative operating system for configuring the operation and functionality of the hypervisor 306, as well as that of domains of lower privilege, such as the domains of the guest virtual machines 310, 312, 314 or other operating systems, which may be heterogeneous (i.e., running different operating systems than each other). The host domain 308 (e.g., the DOM-0) may have direct access to the hardware resources 304 of the host computing device 302 by way of the hypervisor 306, while the guest virtual machine domains 310, 312, 314 may not.

In certain embodiments, the customer of a guest virtual machine may desire to modify the behavior of an instance, such as by configuring a key management server (KMS) activation server, configuring routing DNS suffixes, etc. for an operating system of the instance. As described, the customer can access a console to perform a task such as to provision a data repository, launch a virtual machine in a data plane, or select configuration parameters for a virtualization instance before the instance is launched. In conventional approaches, a configuration service running within the operating system of the instance can perform such functions. A potential downside to such an approach, however, is that modifying the behavior of the instance and/or operating system in such a way may require the operating system to be running at the time of the modification and may require the operating system to reboot one or more times to complete the configuration process. Further, in some situations, some customers may desire that the configuration service, or other such service, is not operating in their instance due to security concerns.

Accordingly, approaches in accordance with various embodiments can provide for an agent 320 that resides on the host domain 308 to configure the operation and/or functionality of the guest virtual machines 310, 312, and 314 before the operating system and/or guest virtual machine is initiated. For example, the agent 320 can be used to make direct modifications to configuration settings for operating systems of the guest virtual machines 310, 312, 314 before guest virtual machines and/or associated operating systems boot. In this way, the agent 320 can access configuration information, such as configuration files and the information can be used to modify one or more volumes associated with the guest virtual machine before the guest virtual machine and/or associated operating system boots. In accordance with various embodiments, an agent operating in the OS can work in conjunction with the agent in the DOM-0. For example, the DOM-0 agent can make changes to the registry and can add some information to the operating system, such as a file with an encryption key in it. Another agent (in the OS) can use the key to decrypt a sysprep answer file. The OS agent can then make changes to the OS as it is running using the information in the answer file and can reboot the OS before giving access to the OS to the customer. The DOM-0 agent can then delete the file with the encryption key in it before giving access to the instance to the customer. In this way, the sysprep answer file is encrypted and cannot be accessed by the customer. Alternatively, in accordance with various embodiments, the DOM-0 agent can delete the sysprep answer file before allowing for access to the instance to the customer.

During the system boot process of the guest virtual machine and/or associated operating system, the guest virtual machine and/or operating system is already configured by the changes made to the operating system configuration settings and/or another agent in the instance (e.g., an OS agent) can access and incorporate the configuration information, which can cause the operation and/or functionality of the guest virtual machine and/or associated operating system to be modified without having to cause the operating system to reboot.

Figure 4:
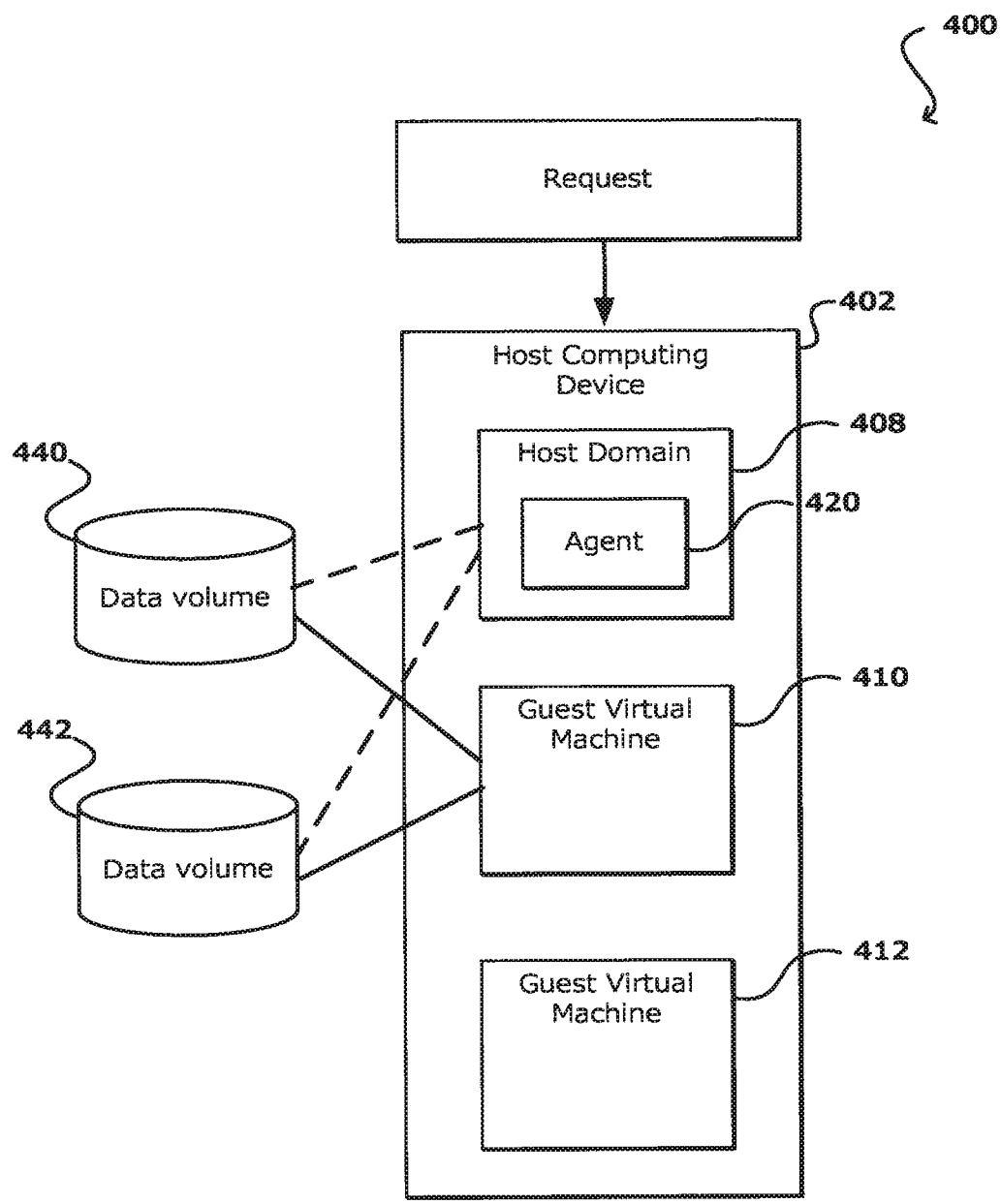
FIG. 4 illustrates an example configuration utilizing an agent to manage virtualization in a shared computing environment in accordance with various embodiments.

For example, FIG. 4 illustrates the relationship 400 between one or more data volumes and the host computing device 402. In this situation, an agent 420 or other such component in the host domain (e.g., DOM-0) is configured to modify the operation and/or functionality of one or more guest machines and/or associated operating systems, in accordance with an embodiment. As described, a request from a customer or other such entity (e.g., an application), including configuration information, can be received by an interface layer (e.g., an application program interface or console) of a resource environment operated by a service provider. This in turn can cause one or more requests to be issued to the host computing device 402 and the agent 420. The request can be, for example, to modify volumes associated with a guest virtual machine, where the agent 420 can modify the volumes by adding and/or removing data. For example, the agent can cause to be mounted one of, or both of, data volumes 440 or 442. The data volume(s) are mounted as a hard drive where the agent can perform one or more read/write operations on the data volume(s). In various embodiments, the agent can understand the file system of the data volume(s). Once the agent accesses the data volumes, the agent can write new files to the file system and/or change operating system settings of the operating system. For example, the agent can write a file in the file system, such as a sysprep answer file or an encryption key that a sysprep agent can use to decrypt a sysprep answer file. In terms of configuration settings, the agent can change parameters for the operating system by adjusting variables in the registry (e.g., if it's a windows instance). These configuration settings that can be set in the registry can include, for example, a license key, username passwords combinations, domain names, domain keys, etc. Once the modification to the data volumes(s) is complete, the volume(s) can be detached from the DOM-0 and attached to the appropriate guest virtual machine. The OS can then boot. In accordance with an embodiment, when the guest virtual machine and/or operating system of the guest virtual machine boots, the operation and/or functionality of the guest virtual machine and/or the operating system associated with the guest virtual machine is modified based on the modifications to the volumes without having to start the operating system. If there are no changes that need to be made by sysprep (i.e., the agent operating on the OS), the user can be given access to the guest virtual machine.

As a further example, as shown in FIG. 4, the host computing device 402 includes a host domain 408 that includes an agent 420 or other component for configuring the operation and/or functionality of domains of the guest virtual machines (410, 412) or other operating systems, which may be heterogeneous (i.e., running different operating systems than each other). Data volumes 440, 442 can include programs (e.g., operating systems, applications, etc.), customer data, and/or other data, such as customer security information, configuration information, drivers, languages, etc. When the data volumes are attached to the host computing device 402, the agent 420 on the host domain 408 can access to the data volumes 440, 442 to make modifications to the volumes. The agent can then boot one or more operating systems off the volumes into a virtual machine. In some instances, the agent 420 can make modifications to the data volumes based on a customer request. For example, the customer can submit a call or request across at least one network to be received to a shared resource environment providing the guest machines, where an interface layer including API and other such components can route the request for the customer to the host computing device 402. The request can include configuration information, and the configuration information can be used by the host domain to modify at least one data volume associated with a customer guest machine. For example, as described, the user can access a console or other graphical interface (e.g., a web application or desktop application) or can utilize at least one API to make calls through the interface layer into a control plane to perform a task such as to provision a data repository, launch a virtual machine in a data plane, or select configuration parameters for a virtualization instance before the instance is launched. In this way, the user can specify configuration parameters that are routed to, and acted on by the agent 420 before the instance is launched. In accordance with an embodiment, the configuration parameters that can be specified by the user using the console in the control plane can include at least, for example, license keys, domain names/passwords, and usernames/passwords. Thereafter, the configuration parameters get passed to the host domain 408 on the host computing device 402 along with the launch request. The agent 420 receives the parameters and implements them in the data volumes.

As described, the agent 420 can modify the attached data volumes. In accordance with various embodiments, modifying the data volumes can include adding and/or removing data from the data volumes. The modifications can include injecting code or data into the data volume, as may include at least one of a customer specified password, code for a customer specified domain join, configuration information for customized network routing, configuration information for regional operating system activation setting for a KMS server, configuration information for enabling/disabling features, configuration information for defining roles, drivers, or languages. Additionally or alternatively, the modifications to the data volumes can include removing data from the data volumes, such as customer information, license keys, or other such security information. For example, one or more administration passwords used by sysprep or any agent operating on the OS can be removed. In other embodiments, instead of removing the passwords, a key used to decrypt the sysprep information (e.g., administration passwords) can be removed, which effectively renders the sysprep information unusable. In at least some embodiments, in the instance where license keys are removed, the license keys can be injected back into the data volume prior to booting the operating system stored thereon. This advantageously allows customer data to be secured, such as by not allowing the data to be visible when the volume is detached then attached to another instance (as may include a different customer instance).

In at least some embodiments, the request can cause one or more data volumes to be mounted to the host computing device, while in other embodiments, the request can cause the data volumes to be referenced to the host computing device. In any situation, the configuration information included in the request can be provided to the host domain. In the situation where the data volumes are mounted to the host computing device, the agent running on the host domain can detect the mounted volumes, and in response to detecting the volumes, can perform an action, such as injecting and/or removing data from the mounted volumes based at least on the request and the configuration information. For example, as shown in example 400 of FIG. 4, a request 450 is received at the host computing device. The request includes configuration information, wherein the configuration information can be utilized by the agent to modify data volumes (440, 442). As an example, the configuration information can be utilized to inject information into data volume 440 that would allow the guest virtual machine 410 to automatically join a particular domain. When the guest virtual machine and/or operating system of the guest virtual machine 410 begins the system boot process, the guest virtual machine and/or operating system can retrieve domain join material from data volume 440, and the domain join material can then be provided to a domain controller to automatically join the customer to a particular domain.

Figure 5:
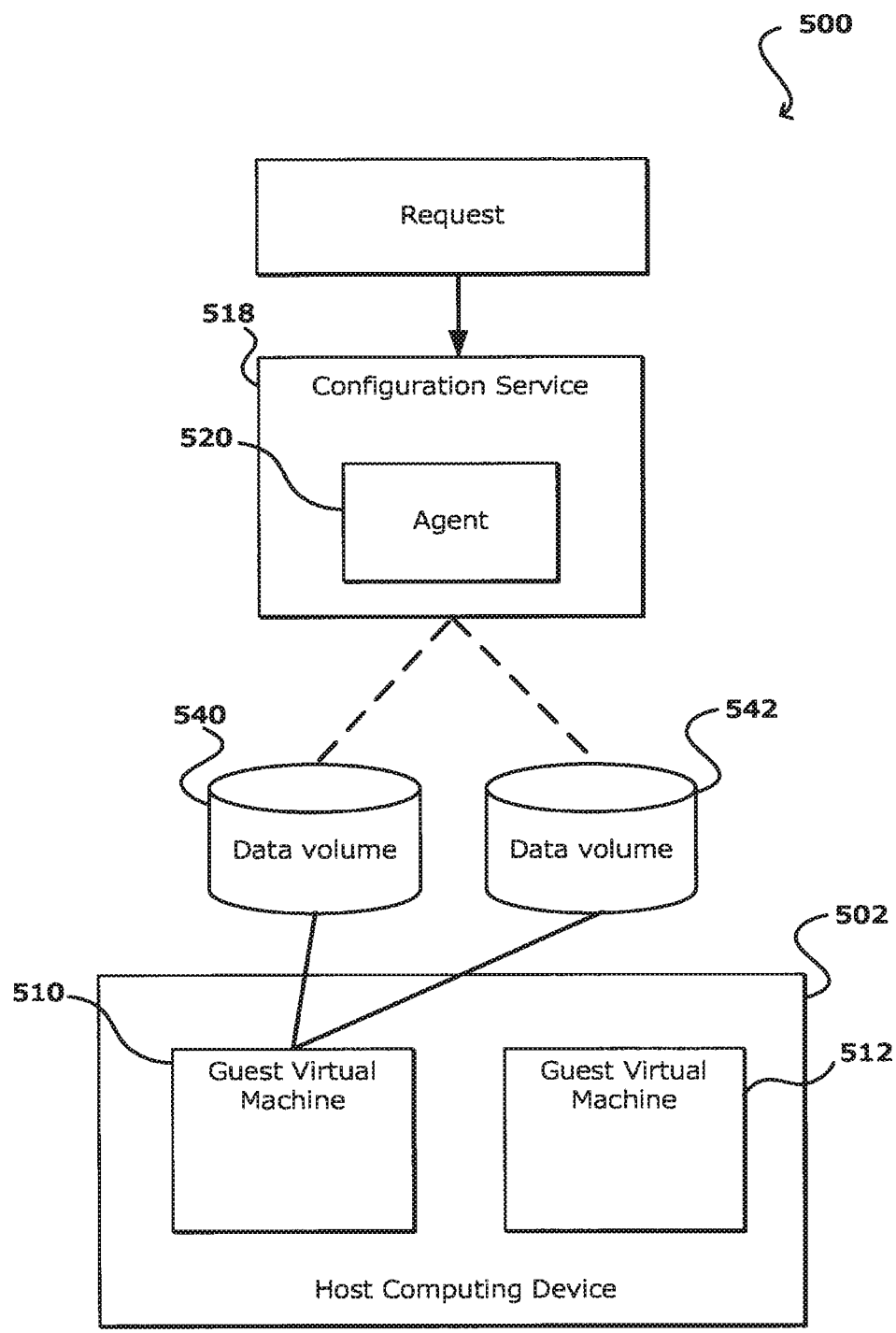
FIG. 5 illustrates an example configuration utilizing an agent to manage virtualization in a shared computing environment in accordance with an alternate embodiment.

It should be noted that in accordance with various embodiments, components other than the host domain or agent residing thereon can make modifications to the data volumes. For example, FIG. 5 illustrates the relationship 500 between one or more data volumes and the host computing device 502. In this situation, a configuration service 518 or a server that includes an agent can be configured to modify the operation and/or functionality of one or more guest machines and/or associated operating systems. A request from a customer or other such entity (e.g., an application), including configuration information, can be received by an interface layer (e.g., an application program interface or console) of a resource environment operated by a service provider. This in turn can cause one or more requests to be issued to the configuration service 518 that includes the agent 520. The request can be, for example, to modify volumes associated with a guest virtual machine, where the agent 520 operating on the service can modify the volumes by adding and/or removing data. For example, agent 520 or another component of the configuration service 518 can access data volumes 540 and 542 which can contain an operating system. During a time when the operating system is not running, the agent 520 can configure the operating system by adding, altering, and/or removing information such as license keys, encryption keys, domain information, language settings, security information, or any other information that can be used to configure an operating system and/or a virtual machine instance. As described, configuring the operating system can include mounting one of, or both of, data volumes 540 or 542, accessing, by at least the agent, the data volumes, and writing new files to the file system and/or changing operating system settings of the operating system. Thereafter, when the virtual machine instance is launched and the operating system boots, the operation and/or functionality of the instance and/or the operating system associated with the instance will have been modified based on the modifications to the volume(s).

Additionally, in accordance with various embodiments, the configuration information can be retrieved by the host domain based at least in part on, e.g., a trigger event such as the mounting of a data volume to the host computing device. In various other embodiments, the configuration information can be provided to the host domain by, e.g., a service or other component of the provider environment, and thus, is not limited to receiving the configuration information by the request.

Figure 6:
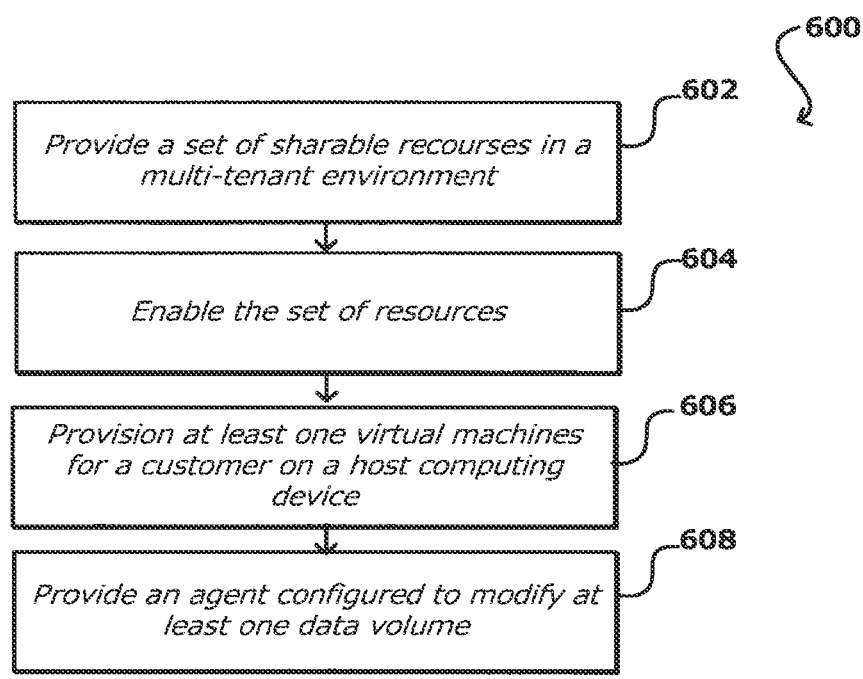
FIG. 6 illustrates an example process for enabling offline data volume modifications that can be utilized in accordance with various embodiments.

FIG. 6 illustrates an example process 600 for enabling offline data volume modifications that can be utilized in accordance with various embodiments, such as by providing an agent that can modify operation and/or functionality of one or more virtual machine instances and/or operating systems configured to run on the virtual machine instance while the virtual machine instances and/or operating systems are offline. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In this example, a set of sharable resources is provided 602 in a multi-tenant environment. Those resources can be enabled 604 to process data and/or instructions of various types. One or more virtual machines are provisioned 606 for a customer on one or more host computing devices, where each virtual machine can include a guest operating system and the virtual machine can be used to execute customer-provided instructions. In various embodiments, any virtualization technology can be used to implement the virtual machine on the host computing device. For example, a combination of a hypervisor, a DOM-0, and an agent can be used to manage the virtual machines on the host computing device. For example, as will be described further in FIG. 7, the provided 608 agent can be configured to modify operation and/or functionality of one or more virtual machine instances and/or operating systems configured to run on the virtual machine instance while the virtual machine instances and/or operating systems are offline. In accordance with an embodiment, the agent can reside on the host machine to which the customer's instance operates, and can access or be provided configuration information that can be used to modify data volumes accessed by an operating system of the customer's instance.

Alternatively, in accordance with various embodiments, a configuration service or a server that includes an agent can be configured to modify the operation and/or functionality of one or more guest machines and/or associated operating systems. In this situation, a request from a customer or other such entity (e.g., an application), including configuration information, can be received by an interface layer (e.g., an application program interface or console) of a resource environment operated by a service provider. This in turn can cause one or more requests to be issued to the configuration service that includes the agent. The request can be, for example, to modify volumes associated with a guest virtual machine, where the agent operating on the service can modify the volumes by adding and/or removing data.

In either situation, during the operating system boot process or a data volume attach operation, the operating system reads and incorporates the configuration information injected into the data volumes, which is used to modify the operation and/or functionality of the operating system and/or virtual machine. As described, the modifications can include modifying the operating system image stored in the data volume. For example, the agent can modify the volume in at least one way, such as by injecting a customer specified password, configuring the instance to join a customer specified domain, configuring the network routing functions of the instance, specify regional operating system activation setting for a KMS server, enabling/disabling features, define roles, install drivers, or languages, optimizing the host machine, such as by setting up multiple CPUs or RAM used by the host machine. Additionally or alternatively, the modifications to the data volumes can include removing data from the data volumes, such as customer information, license keys, or other such security information.

Figure 7:
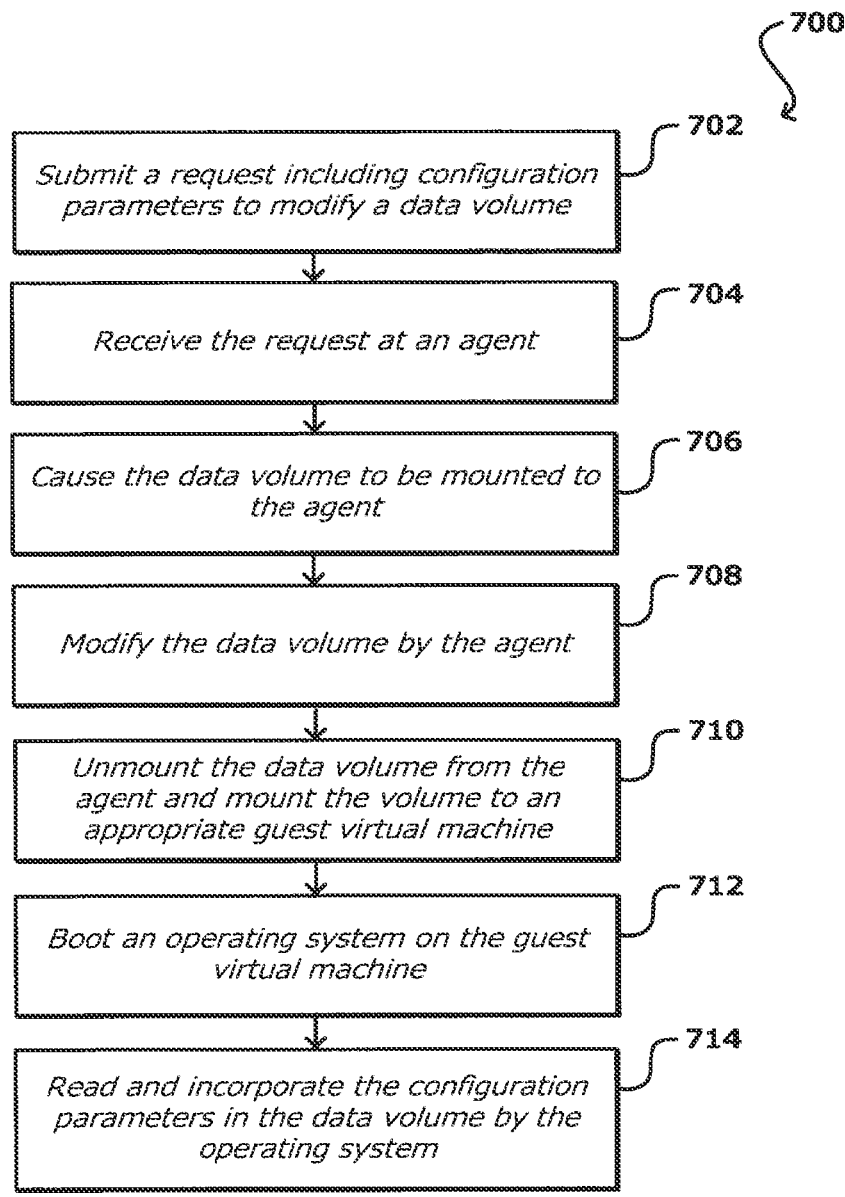
FIG. 7 illustrates an example process for modifying offline data volumes in accordance with various embodiments.

In accordance with an embodiment, the customer can submit a request to obtain a virtual machine instance to a service provider, indicating the instance (e.g., program) they would like to use. The service provider may carry out the processes to provision the host to launch the instance, which can be used to execute various applications utilizing the resources of the service provider. In accordance with an embodiment, a customer may desire to configure the operation and/or functionality of the virtual machine and/or operating system. For example, FIG. 7 illustrates an example process 700 for modifying operation and/or functionality of one or more virtual machine instances and/or operating systems configured to run on the virtual machine instance while the virtual machine instances and/or operating systems are offline. In accordance with an embodiment, an agent can make modifications to the data volumes based on a customer request. For example, the customer can access a console or other graphical interface (e.g., a web application or desktop application) or can utilize at least one API to submit 702 a web services call or request that includes configuration parameters across at least one network to be received to the shared resource environment providing the virtual machines, where an interface layer including API and other such components can route 704 the request for the customer to the agent. As described, the agent can reside on the host machine to which the customer's instance operates, and can access or be provided configuration information that can be used to modify data volumes accessed by an operating system of the customer's instance. Alternatively, in accordance with various embodiments, a configuration service or a server that includes the agent can be configured to modify the operation and/or functionality of one or more guest machines and/or associated operating systems.

In accordance with an embodiment, the customer can specify configuration parameters that are routed to, and acted on by the agent before the instance is launched. In accordance with an embodiment, the configuration parameters that can be specified by the user using the console and can include at least, for example, license keys, domain names/passwords, and usernames/passwords, among others, and can be used to modify at least one data volume.

Once the request is received, at least one data volume can be caused to be mounted 706 to the agent, while in other embodiments, the request can cause the data volume to be referenced to the agent. The agent can detect the mounted data volume, and in response to detecting the data volume can perform an action 708, such as modifying at the data volume by adding and/or removing data from the data volume based at least on the request and the configuration information. For example, when the data volume is mounted, the data volume can be accessed by the agent such as in the case of a hard drive or other drive, where the agent can perform one or more read/write operations on the data volume. Accordingly, the agent can write new files to the file system and/or change operating system settings of the operating system. For example, the agent can write a file in the file system, such as a sysprep answer file or an encryption key that a sysprep agent can use to decrypt a sysprep answer file. In terms of configuration settings, the agent can change parameters for the operating system by adjusting variables in the registry (e.g., if it's a windows instance). These configuration settings that can be set in the registry can include, for example, a license key, username passwords combinations, domain names, domain keys, etc. Once the modification to the data volume is complete, the volume can be unmounted from the agent and mounted 710 to the appropriate guest virtual machine. The OS can then boot 712. During the system boot process, the operating system reads and incorporates 714 the configuration information in the data volume, which is used to modify the operation and/or functionality of the guest virtual machine and/or the operating system of the guest virtual machine. Alternatively, in accordance with an embodiment, when the operating system boots, the operating system operates based at least in part on the configuration information without having to incorporate or further process the configuration information.

Figure 8:
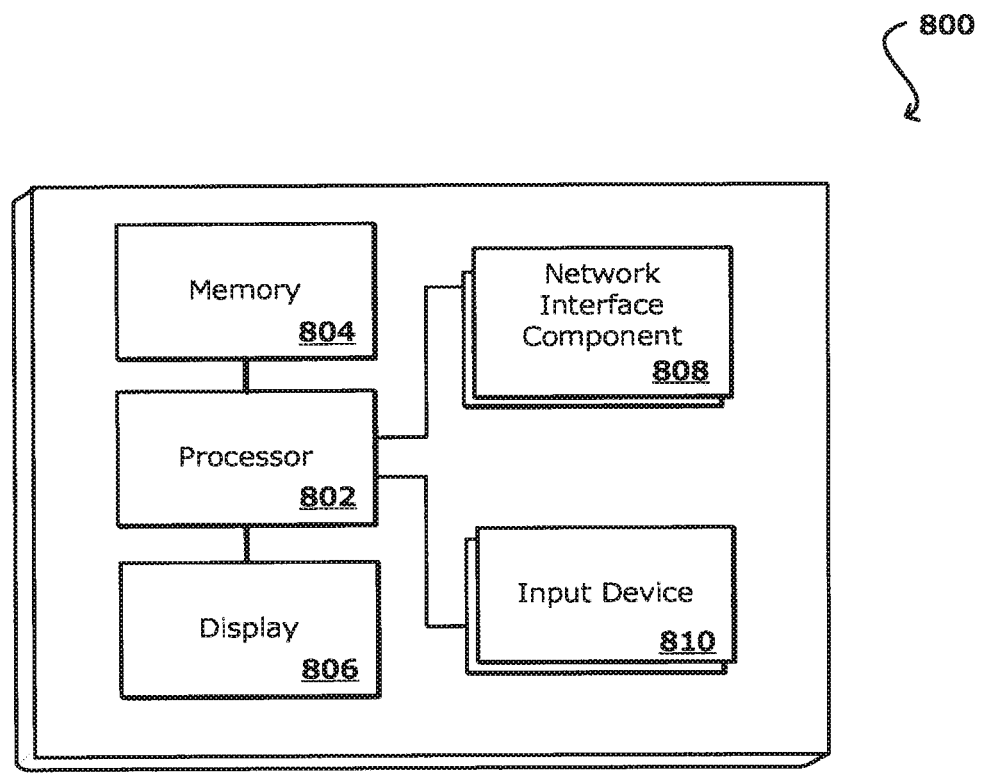
FIG. 8 illustrates example components of a computing device that can be utilized in accordance with various embodiments.

FIG. 8 illustrates a logical arrangement of a set of general components of an example computing device 800. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one input element 808 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 800 of FIG. 8 can include one or more network interface elements 808 for communicating over various networks, such as a Wi-Fi, Bluetooth, RF, wired, or wireless communication systems. The device in many embodiments can communicate with a network, such as the Internet, and may be able to communicate with other such devices.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" or "data volume" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method, comprising:
receiving a request at a control plane of a service provider to configure a guest operating system (OS) stored on a volume, the request identifying a customer account;
removing data from the volume;
mounting the volume by an agent running in a host domain, the host domain operated by the service provider and being logically or virtually separated from the control plane;
modifying the volume, by the agent, to change configuration data as specified in the request;
un-mounting the volume; and
booting the guest OS in a guest virtual machine (VM) in the customer account with the change applied to the configuration data.

2. The computer implemented method of claim 1, further comprising:
injecting second data into the volume during the modifying of the volume, the second data comprising at least one of a customer specified password, credential information for a customer specified domain join, configuration information for customized network routing, configuration information to change a name of a virtual machine instance, or configuration information to adjust a language of an OS.

3. The computer implemented method of claim 1, further comprising:
receiving configuration information for the modifying of the volume from a customer of the service provider or a service operating with the service provider.

4. The computer implemented method of claim 3, further comprising:
adding key material from the configuration information into the volume;
causing the guest OS to boot, the guest OS configured to retrieve the key material added to the volume and provide the key material to a domain controller to join a domain; and
causing the guest OS to automatically join the domain.

5. A system, comprising:
at least one processor;
a control plane of a service provider capable of managing guest VMs; and
memory including instructions that, when executed by the at least one processor, cause the system to:
receive a request at the control plane of the service provider to configure a guest operating system (OS) stored on a volume, the request identifying a customer account;
remove data from the volume;
mount the volume by an agent of a host domain, the host domain operated by the service provider and being logically or virtually separated from the control plane;
modify the volume, by the agent, to change configuration data as specified in the request;
un-mount the volume; and
boot the guest OS in a guest virtual machine (VM) in the customer account with the change applied to the configuration data.

6. The system of claim 5, wherein the instructions, when executed, further cause the system to:
inject second data into the volume during the modifying of the volume, the second data comprising at least one of a customer specified password, credential information for a customer specified domain join, configuration information for customized network routing, configuration information to change a name of a virtual machine instance, or configuration information to adjust a language of an OS.

7. The system of claim 5, wherein the instructions, when executed, further cause the system to:
receive configuration information for the modifying of the volume from a customer of the service provider or a service operated by the service provider.

8. The system of claim 7, wherein the instructions, when executed, further cause the system to:
add key material from the configuration information into the volume;
cause the guest OS to boot, the guest OS configured to retrieve the key material added to the volume and provide the key material to a domain controller to join a domain; and
cause the guest OS to automatically join the domain.

9. The system of claim 5, wherein the instructions, when executed, further cause the system to:
in response to receiving the request, cause the volume to be mounted to a host computing system or the volume to be referenced to the agent;
detect the volume by the agent; and
perform an action by the agent.

10. The system of claim 9, wherein the action comprises an addition or a deletion of the configuration data as part of the change specified in the request.

11. The system of claim 9, wherein the control plane and the host computing system are in different domains.

12. The system of claim 5, wherein the instructions, when executed, further cause the system to:
allocate, by the agent, at least one of additional memory or computing resources to the guest VM.

13. The system of claim 5, wherein the instructions, when executed, further cause the system to:
modify, by the guest VM under control of a virtual machine manager, the configuration data for the guest OS of an image of the guest OS stored in the volume while the guest OS is offline in accordance with at least configuration information of a customer associated with the customer account.

14. A non-transitory computer readable storage medium storing one or more instructions that, when executed by at least one processor, cause the at least one processor to:
receive a request at a control plane of a service provider environment to configure a guest operating system (OS) stored on a volume, the request identifying a customer account;
remove data from the volume;
mount the volume by an agent of the host domain, the host domain operated by the service provider and being logically or virtually separated from the control plane;
modify the volume, by the agent, to change configuration data as specified in the request;
un-mount the volume; and
boot the guest OS in a guest virtual machine (VM) in the customer account with the change applied to the configuration data.

15. The non-transitory computer readable storage medium of claim 14, further comprising instructions executed by the one or more processors to perform the operations of:
inject second data into the volume during the modifying of the volume, the second data comprising at least one of a customer specified password, credential information for a customer specified domain join, configuration information for customized network routing, configuration information to change a name of a virtual machine instance, or configuration information to adjust a language of an OS.

16. The non-transitory computer readable storage medium of claim 14, further comprising instructions executed by the one or more processors to perform the operations of:
receive configuration data for the modifying of the volume from a customer of the service provider or a service operated by the service provider.

17. The non-transitory computer readable storage medium of claim 14, further comprising instructions executed by the one or more processors to perform the operations of:
add key material from the configuration information into the volume;
cause the guest OS to boot, the guest OS configured to retrieve the key material added to the volume and provide the key material to a domain controller to join a domain; and
cause the guest OS to automatically join the domain.

* * * * *